United States Patent
Cope et al.

(10) Patent No.: US 10,471,374 B2
(45) Date of Patent: Nov. 12, 2019

(54) FILTRATION SYSTEM FOR PROVIDING CLEAN FUEL

(71) Applicant: CATERPILLAR MOTOREN GMBH & CO. KG, Kiel (DE)

(72) Inventors: Troy D. Cope, Kiel (DE); Robert Graumuller, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 1388 days.

(21) Appl. No.: 14/385,778

(22) PCT Filed: Feb. 26, 2013

(86) PCT No.: PCT/EP2013/000555
§ 371 (c)(1),
(2) Date: Sep. 17, 2014

(87) PCT Pub. No.: WO2013/143639
PCT Pub. Date: Oct. 3, 2013

(65) Prior Publication Data
US 2015/0041415 A1    Feb. 12, 2015

(30) Foreign Application Priority Data
Mar. 29, 2012 (EP) .................................... 12162269

(51) Int. Cl.
*B01D 29/88* (2006.01)
*B01D 29/60* (2006.01)
(Continued)

(52) U.S. Cl.
CPC .......... *B01D 29/885* (2013.01); *B01D 29/60* (2013.01); *F02M 37/0064* (2013.01); *F02M 37/0088* (2013.01); *F02M 37/22* (2013.01)

(58) Field of Classification Search
CPC ...... B01D 29/885; B01D 29/60; B01D 29/88; F02M 37/0064; F02M 37/0088; F02M 37/22
(Continued)

(56) References Cited

U.S. PATENT DOCUMENTS

| 4,427,545 A | 1/1984 | Arguilez |
| 5,078,901 A | 1/1992 | Sparrow |

(Continued)

FOREIGN PATENT DOCUMENTS

| CN | 102203406 | 9/2011 |
| EP | 2 157 014 | 2/2010 |

(Continued)

OTHER PUBLICATIONS

European Search Report dated Sep. 4, 2012.
International Search Report dated Jun. 11, 2013.

*Primary Examiner* — Robert Clemente
*Assistant Examiner* — Akash K Varma

(57) ABSTRACT

A filtration system is configured to provide clean fuel to a running combustion engine. The filtration system may be configured to be connected to a main fuel tank for storing contaminated fuel, and to be connected to a fuel supply of a combustion engine. A filtration circuit may include at least one filter, a first auxiliary fuel tank for containing fuel, and a first fuel pump configured to pump the fuel from the first auxiliary fuel tank through the filtration circuit back to the first auxiliary fuel tank. A second auxiliary fuel tank may be connectable to said first auxiliary fuel tank for receiving fuel from the first auxiliary fuel tank via a transfer valve. A control unit may be configured to control the transfer valve such that the first auxiliary tank is fluidly connected to the second auxiliary fuel tank only if fuel of a desired contamination level is contained in the first auxiliary tank.

20 Claims, 17 Drawing Sheets

(51) Int. Cl.
*F02M 37/00* (2006.01)
*F02M 37/22* (2019.01)

(58) Field of Classification Search
USPC .......................... 210/741, 805, 96.1, 90, 87
See application file for complete search history.

(56) References Cited

U.S. PATENT DOCUMENTS

| | | |
|---|---|---|
| 5,336,396 A | 8/1994 | Shetley |
| 5,336,418 A | 8/1994 | Rawlins |
| 6,485,636 B1 | 11/2002 | Moss |
| 6,596,174 B1 * | 7/2003 | Marcus ................ B01D 36/003 |
| | | 210/104 |
| 7,546,835 B1 | 6/2009 | Hilditch |
| 7,681,556 B2 | 3/2010 | Hwang |
| 7,845,334 B2 | 12/2010 | Lippa et al. |
| 2010/0193415 A1 | 8/2010 | Nagai |
| 2011/0043799 A1 * | 2/2011 | Mitani ................ G01N 21/552 |
| | | 356/300 |

FOREIGN PATENT DOCUMENTS

| | | | |
|---|---|---|---|
| EP | 2157014 A1 * | 2/2010 | ............ B63H 21/14 |
| JP | 58-59360 | 4/1983 | |
| JP | 58-155263 | 9/1983 | |
| JP | 62-51750 | 3/1987 | |
| JP | 11-200973 | 7/1999 | |
| JP | 2007-231805 | 9/2007 | |
| JP | 2009-241903 | 10/2009 | |
| JP | 2010-70007 | 4/2010 | |
| WO | WO 2013/143639 | 10/2013 | |

\* cited by examiner

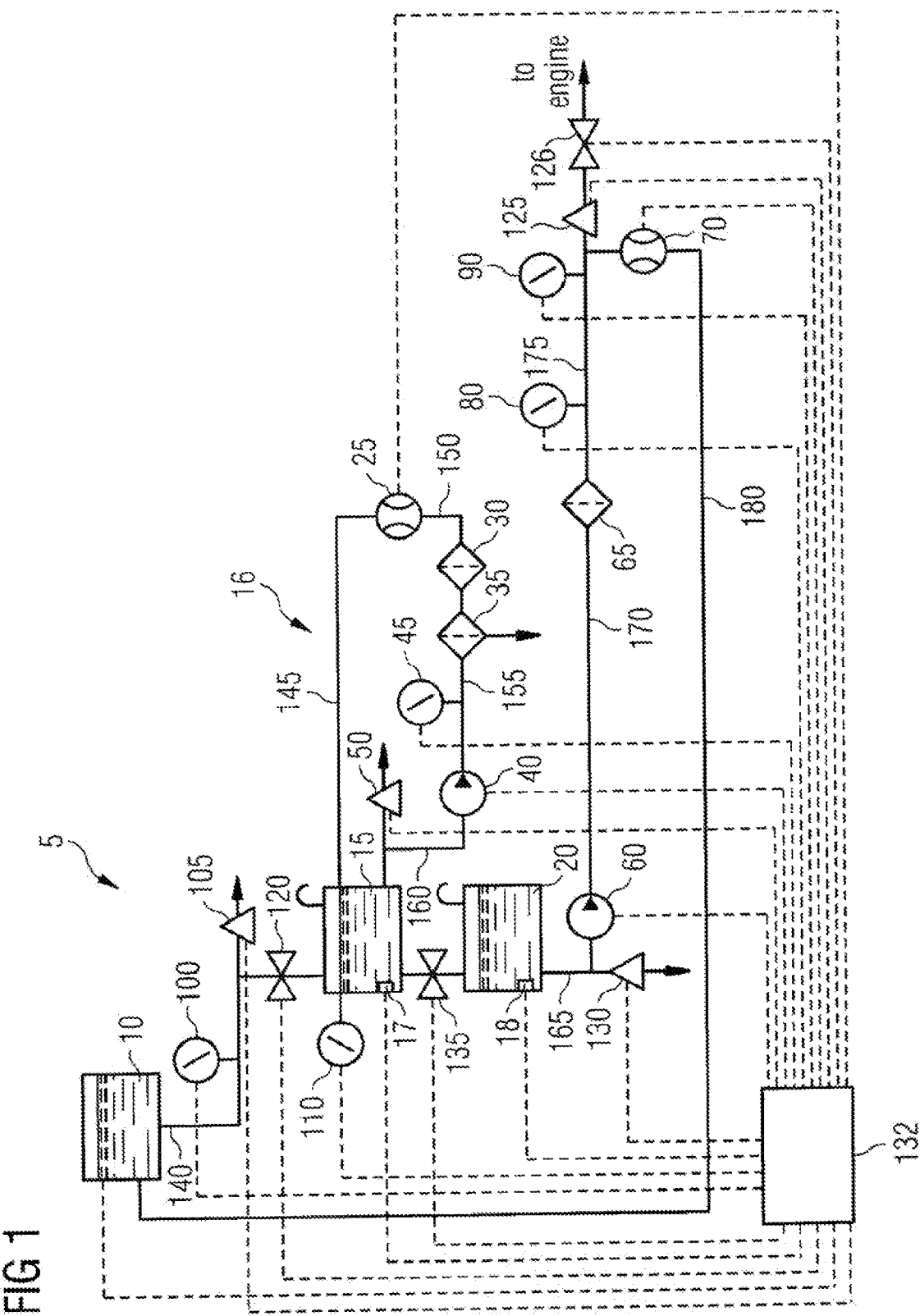

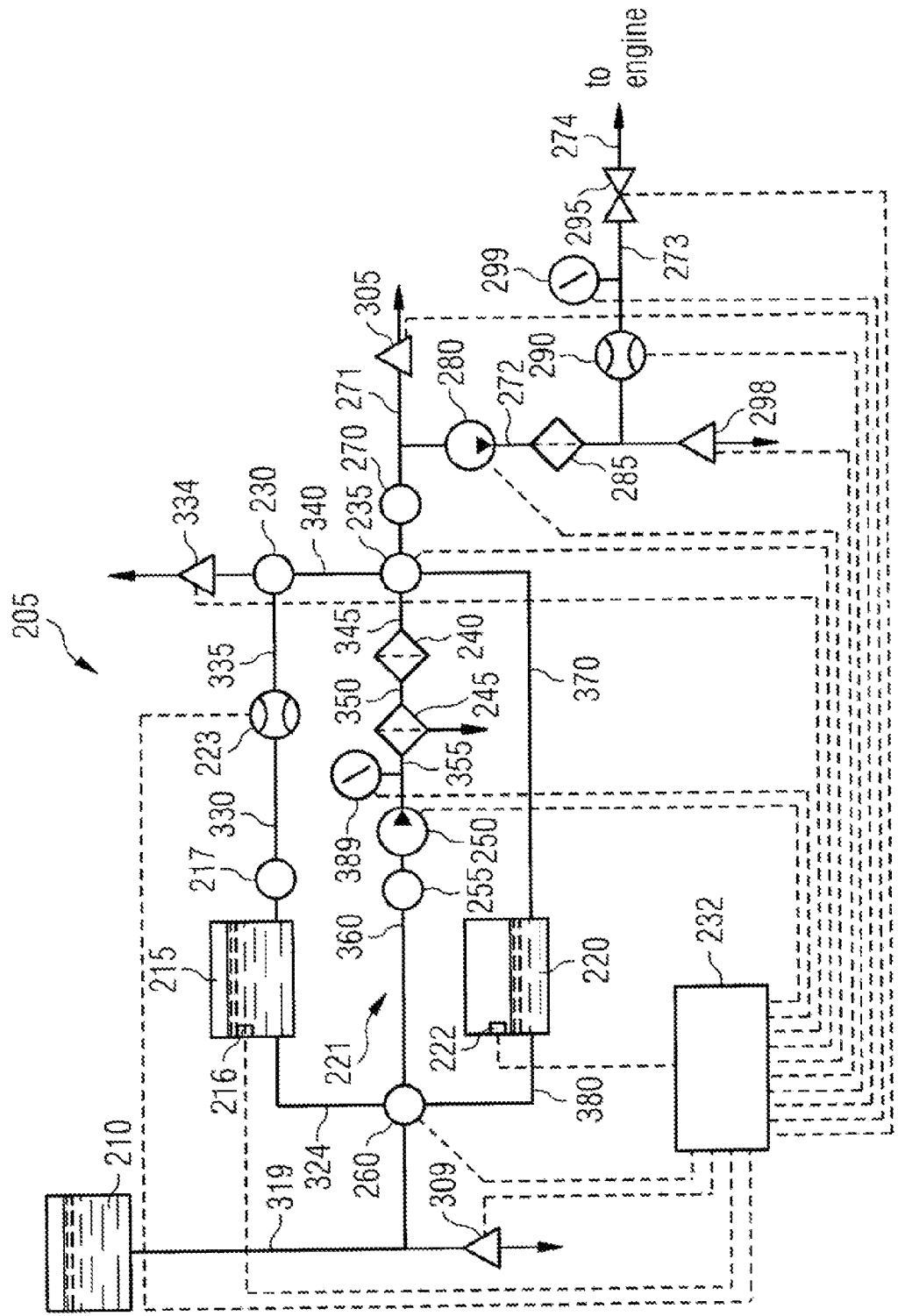

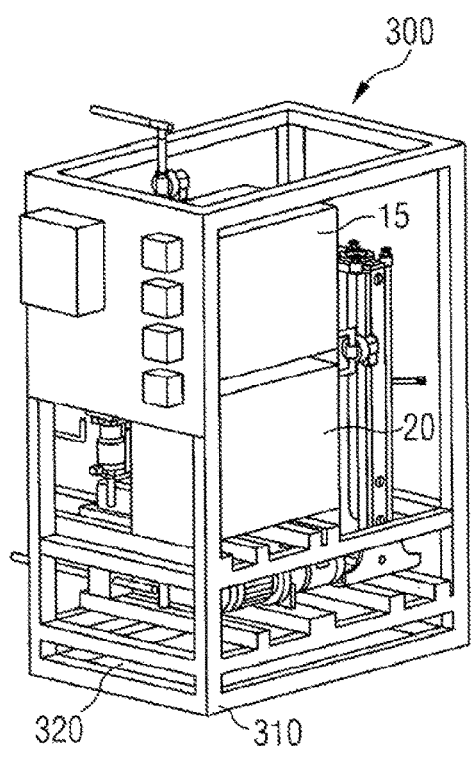
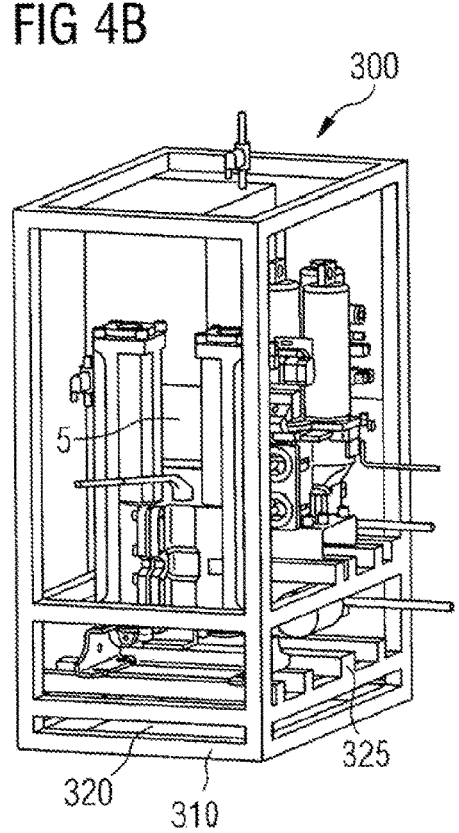

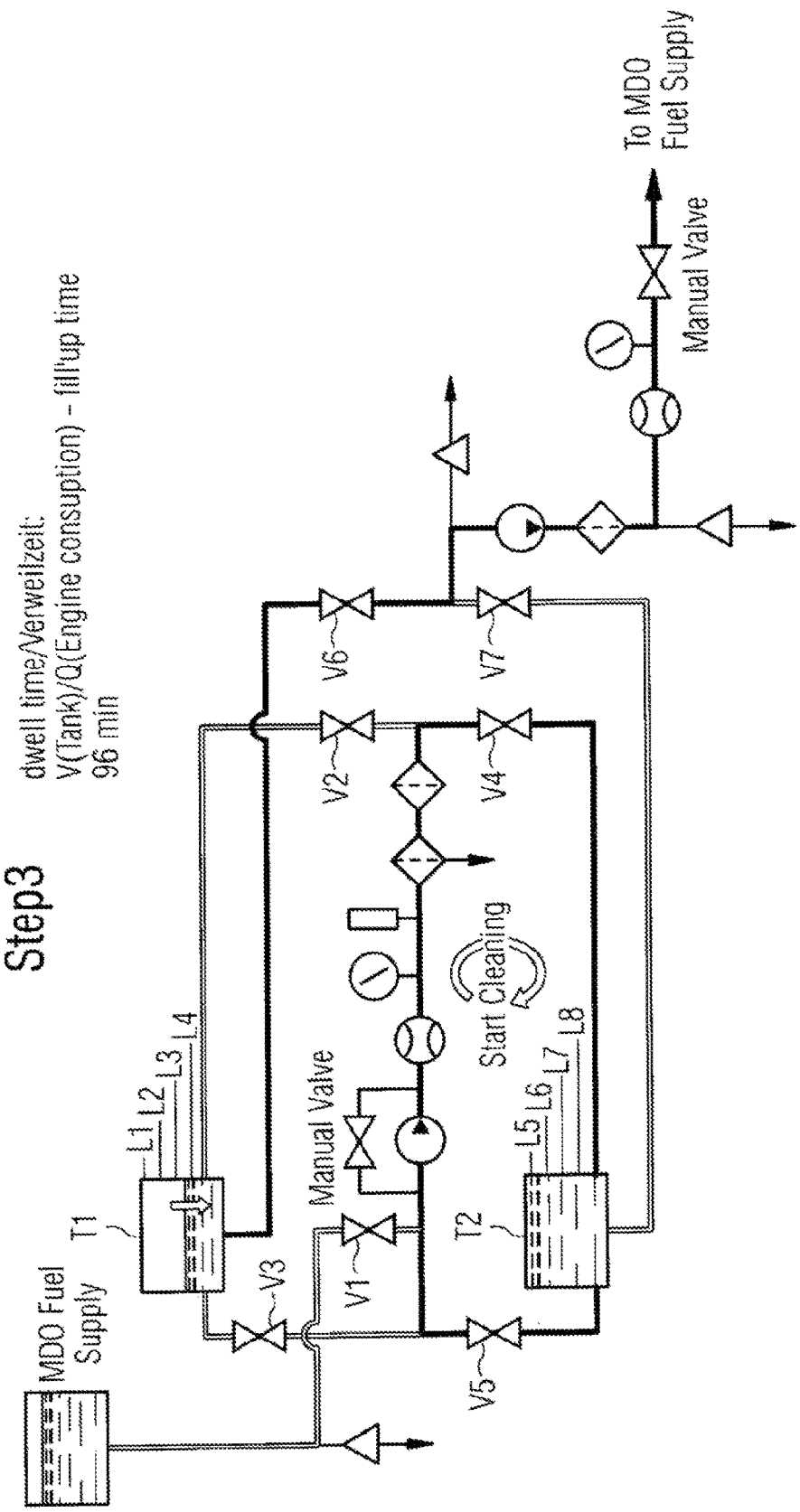

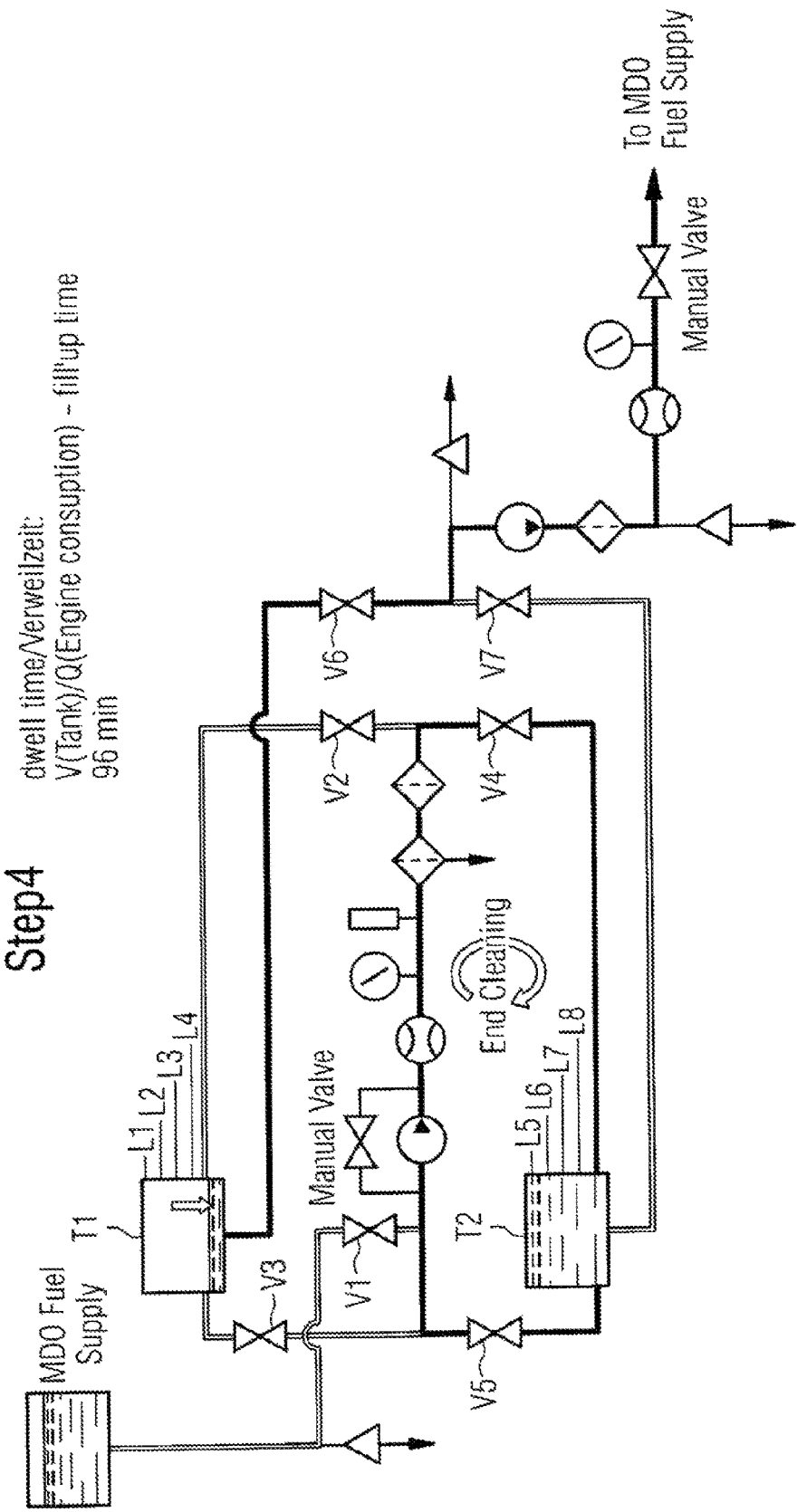

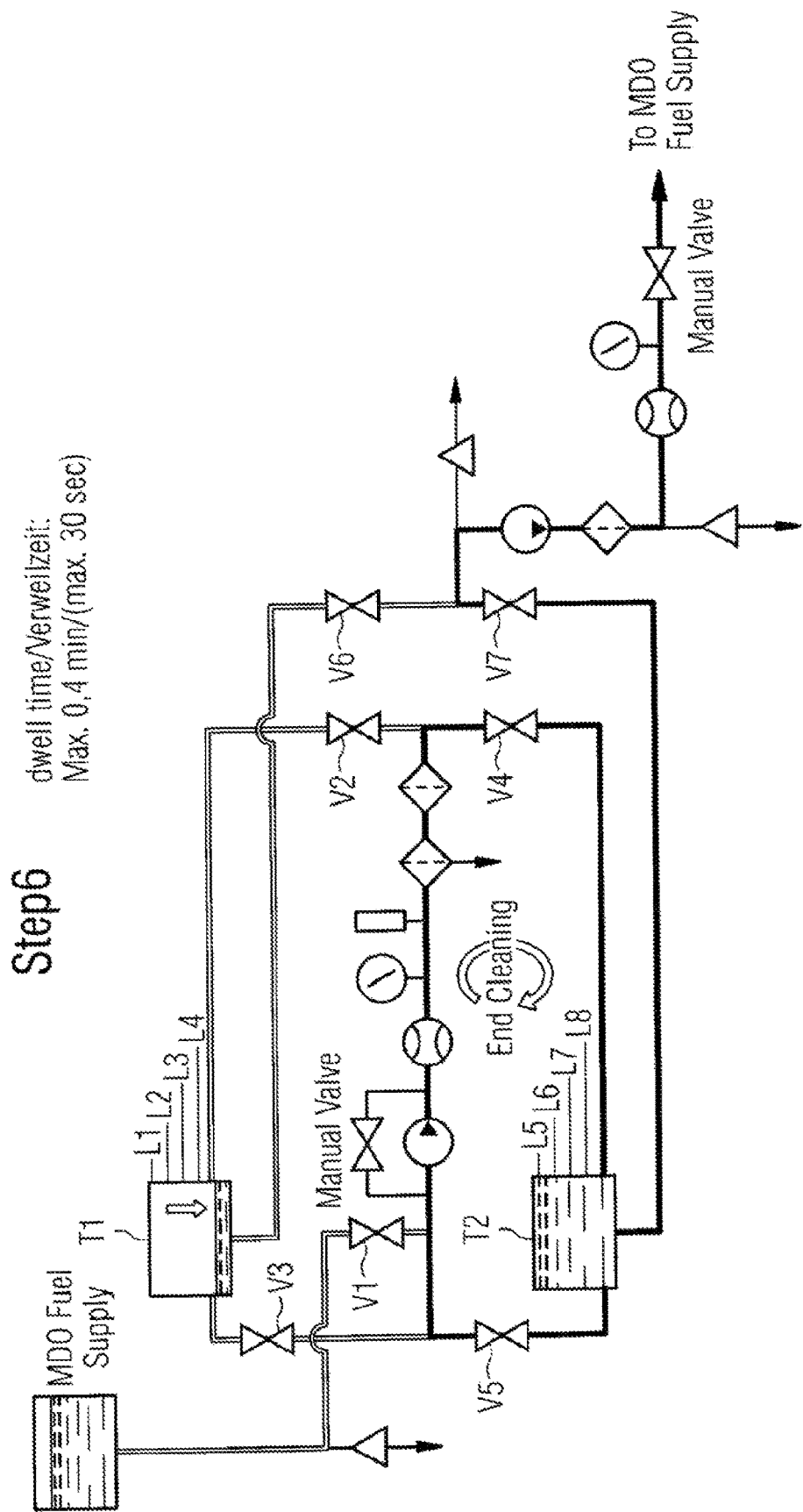

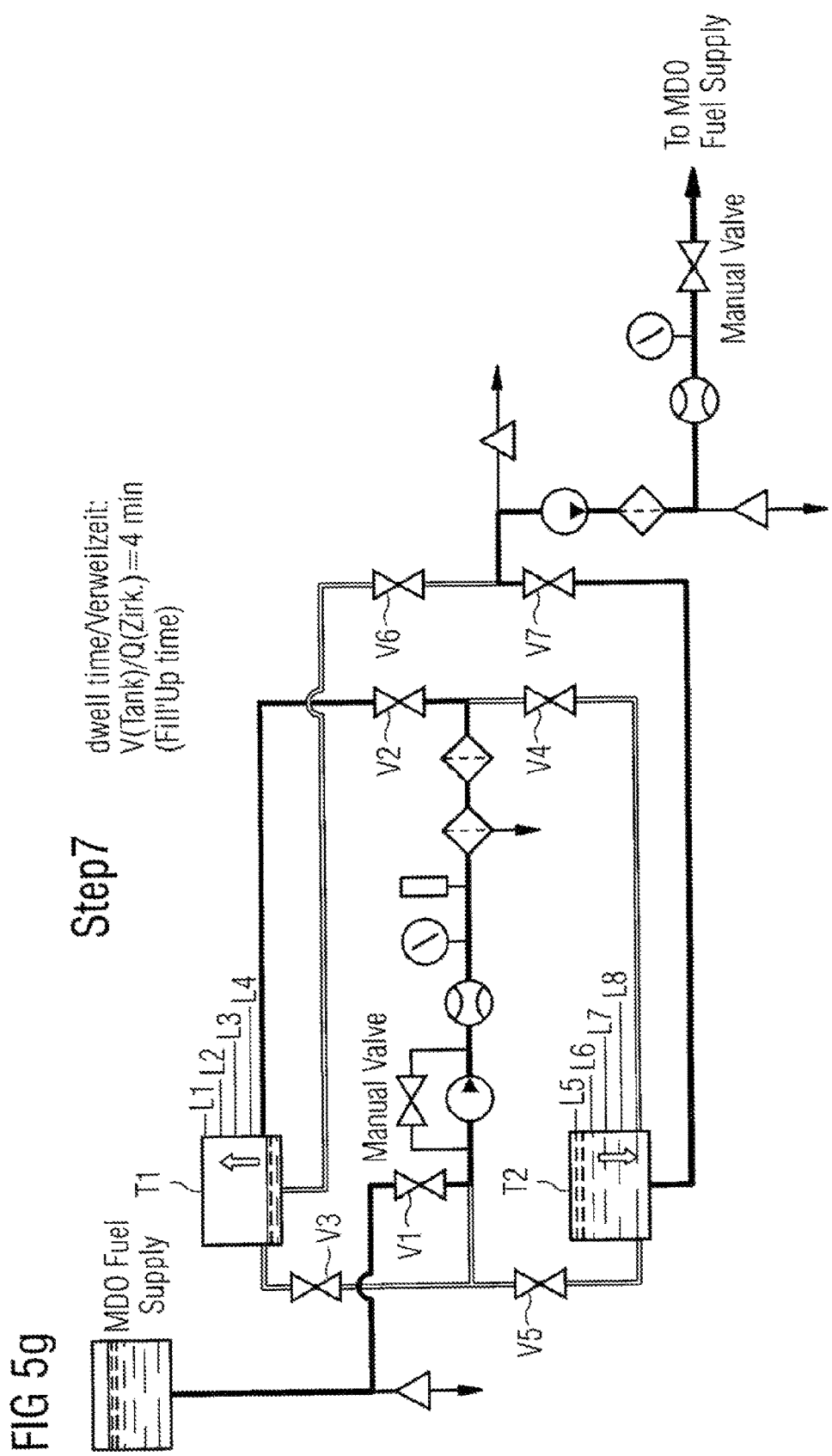

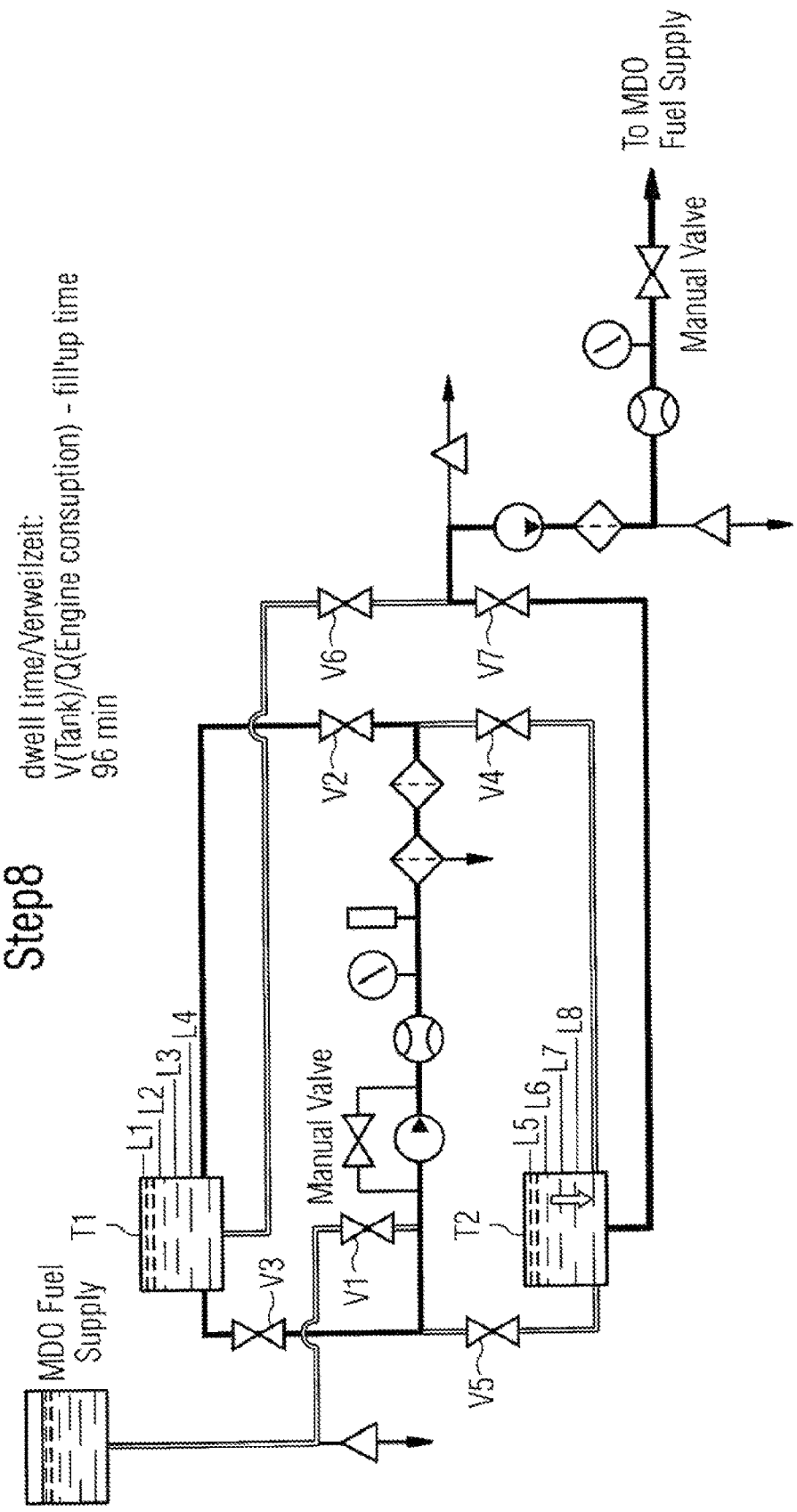

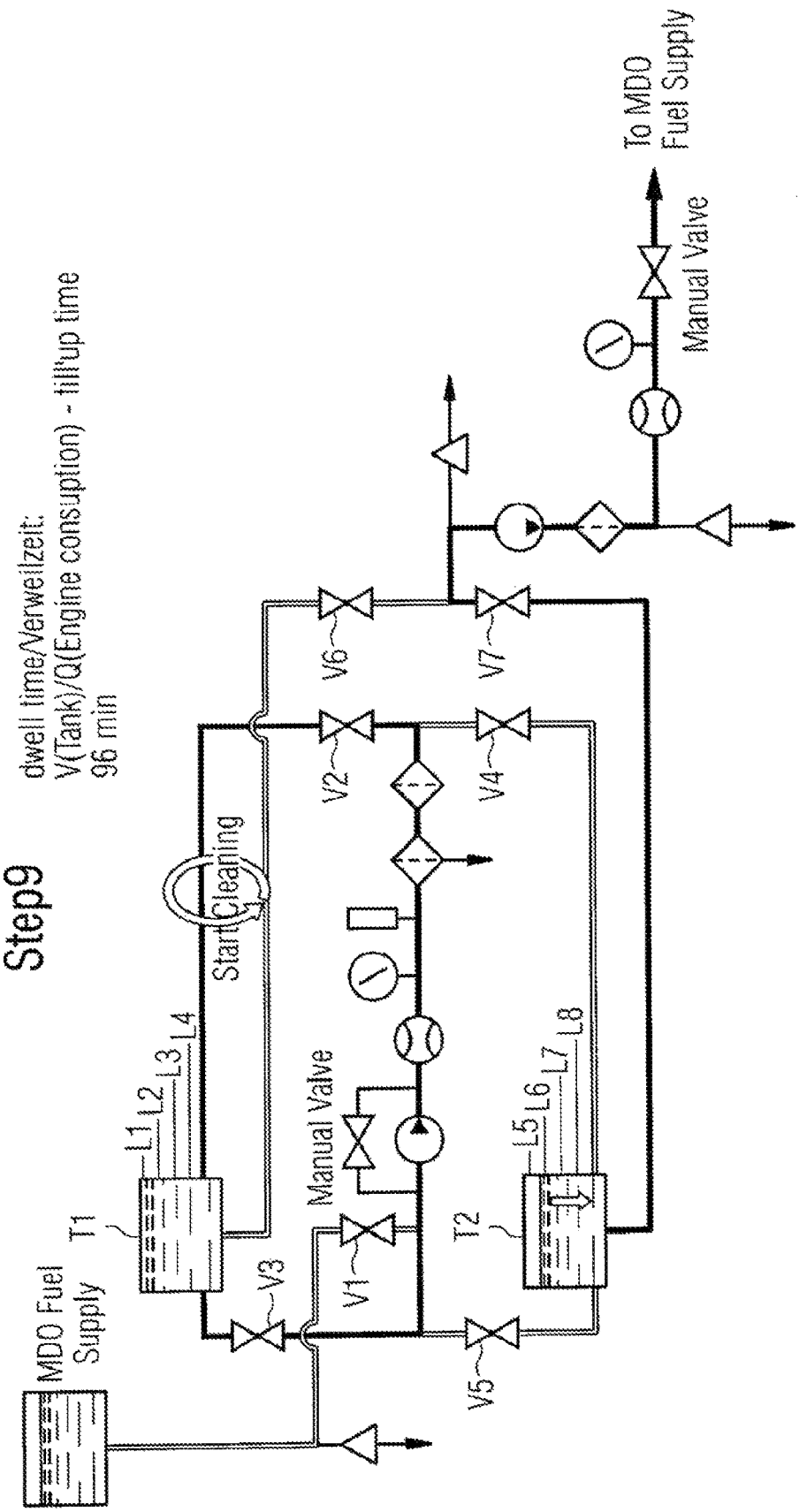

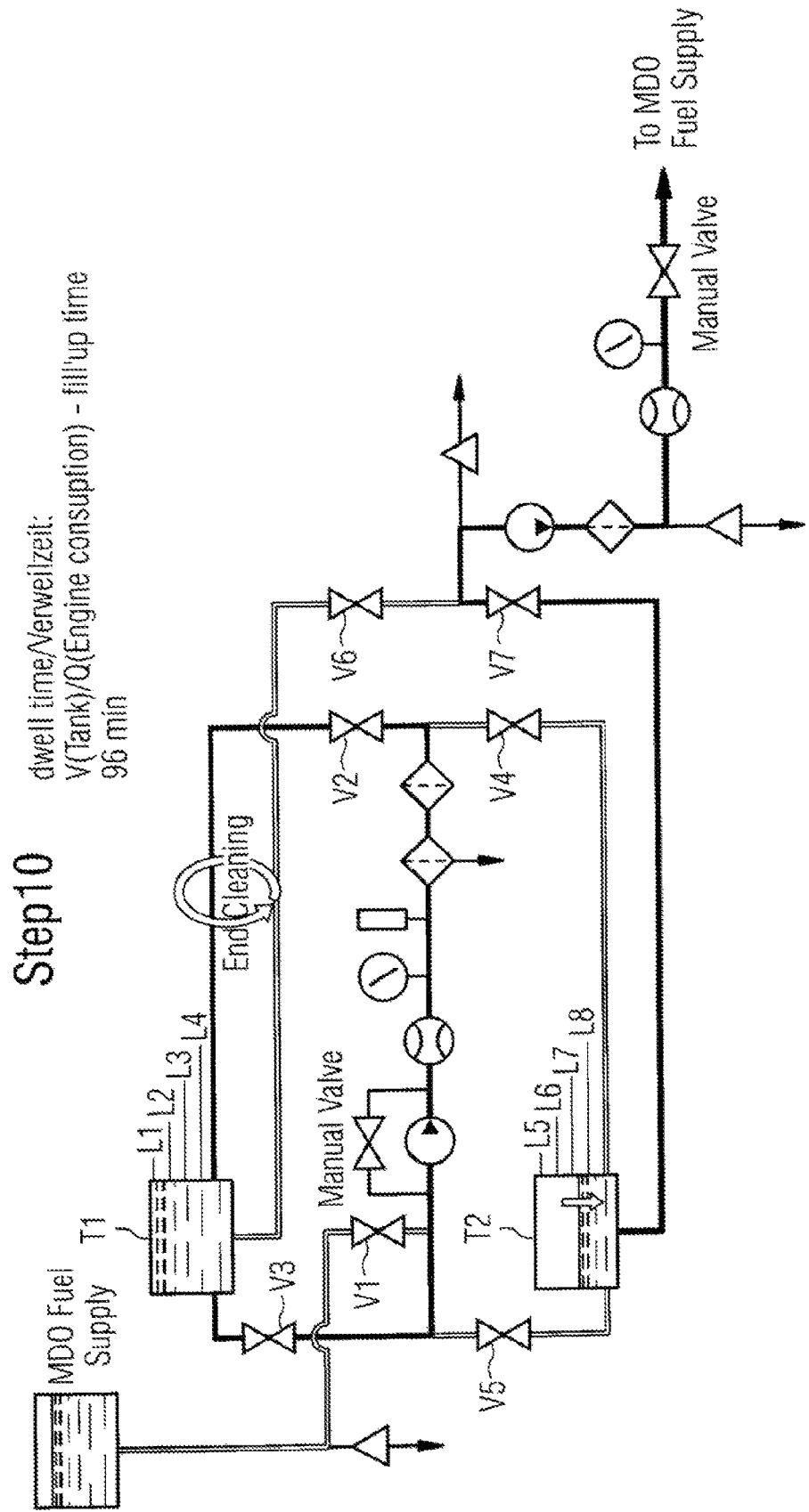

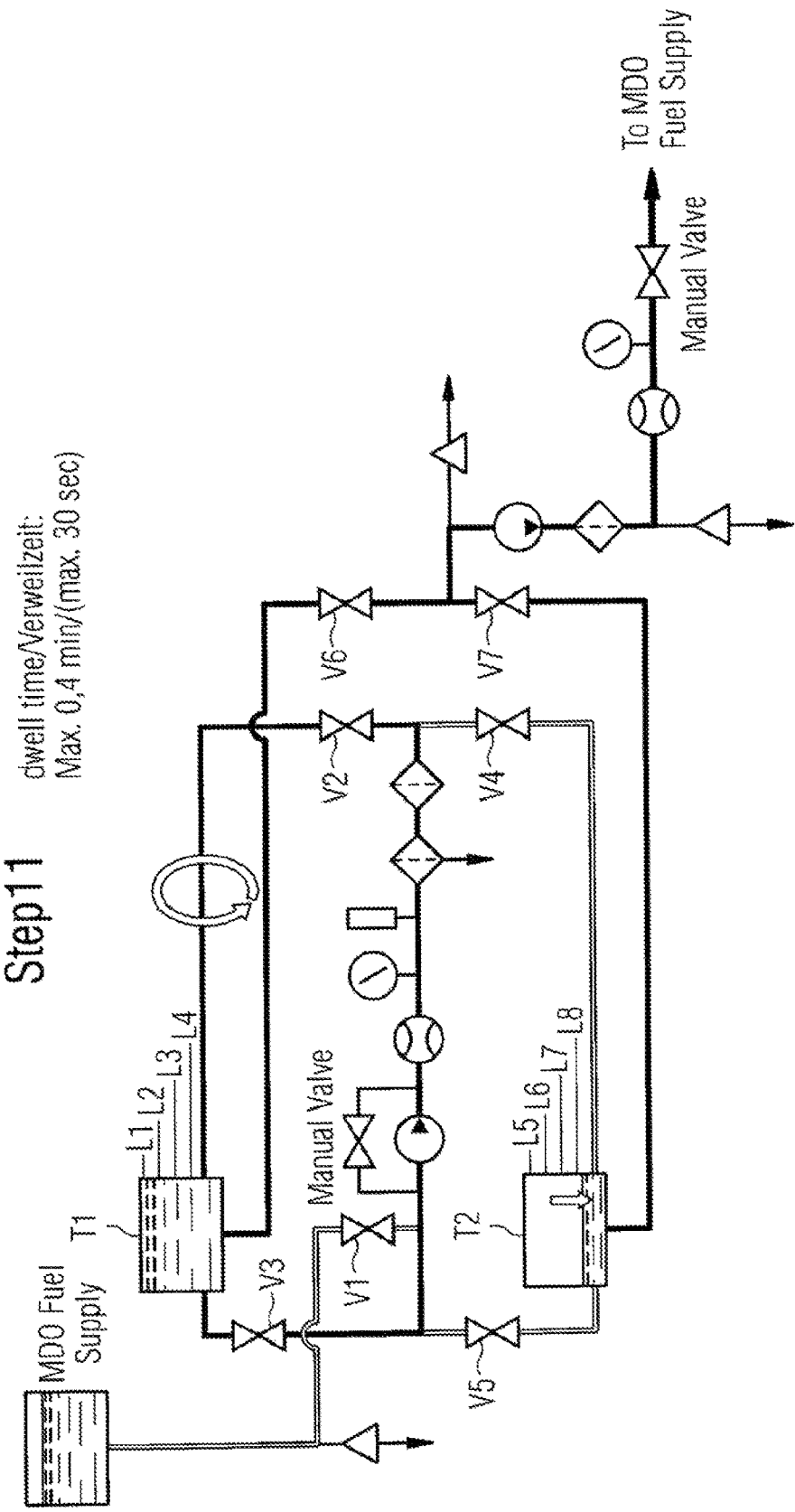

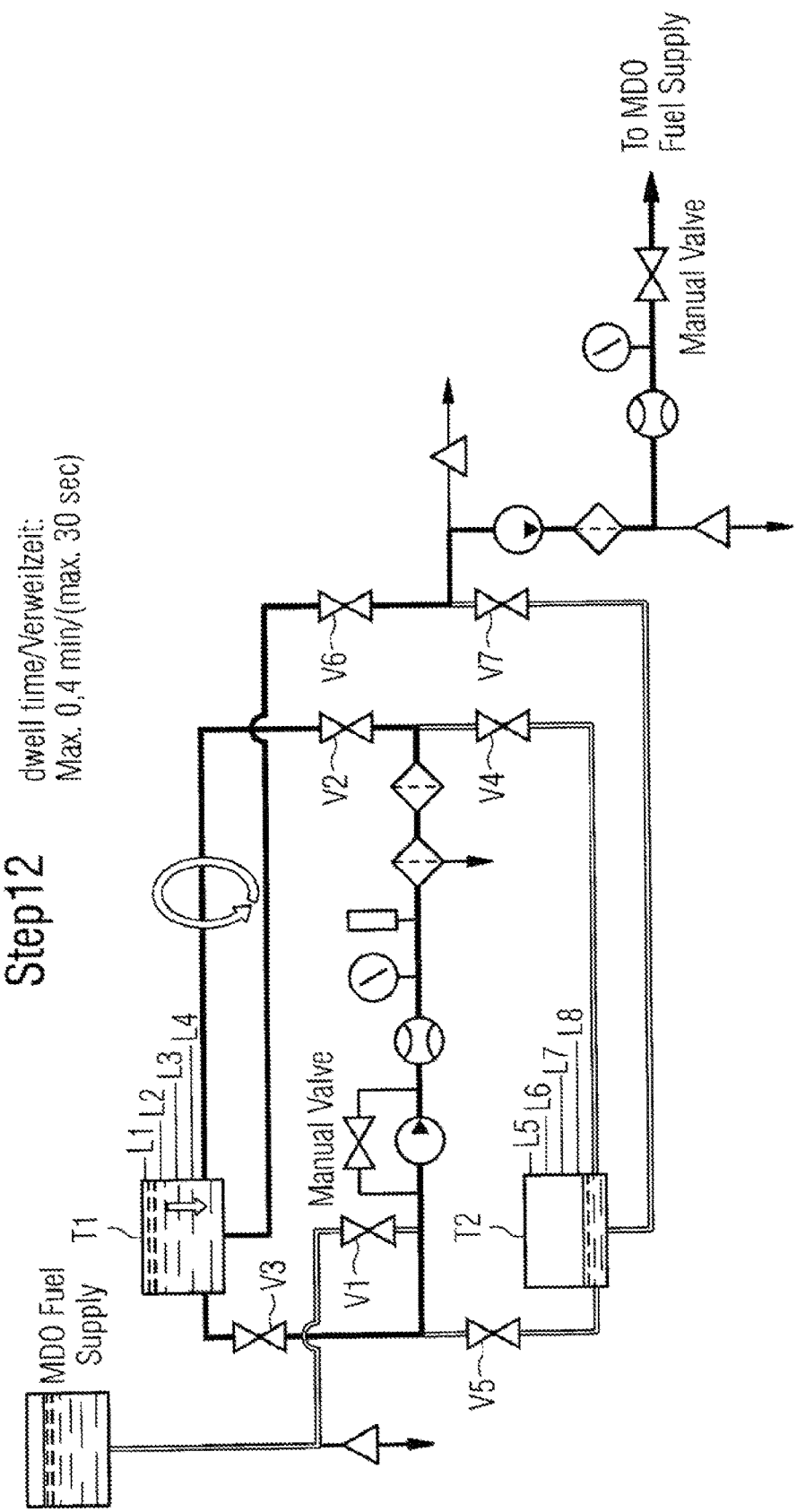

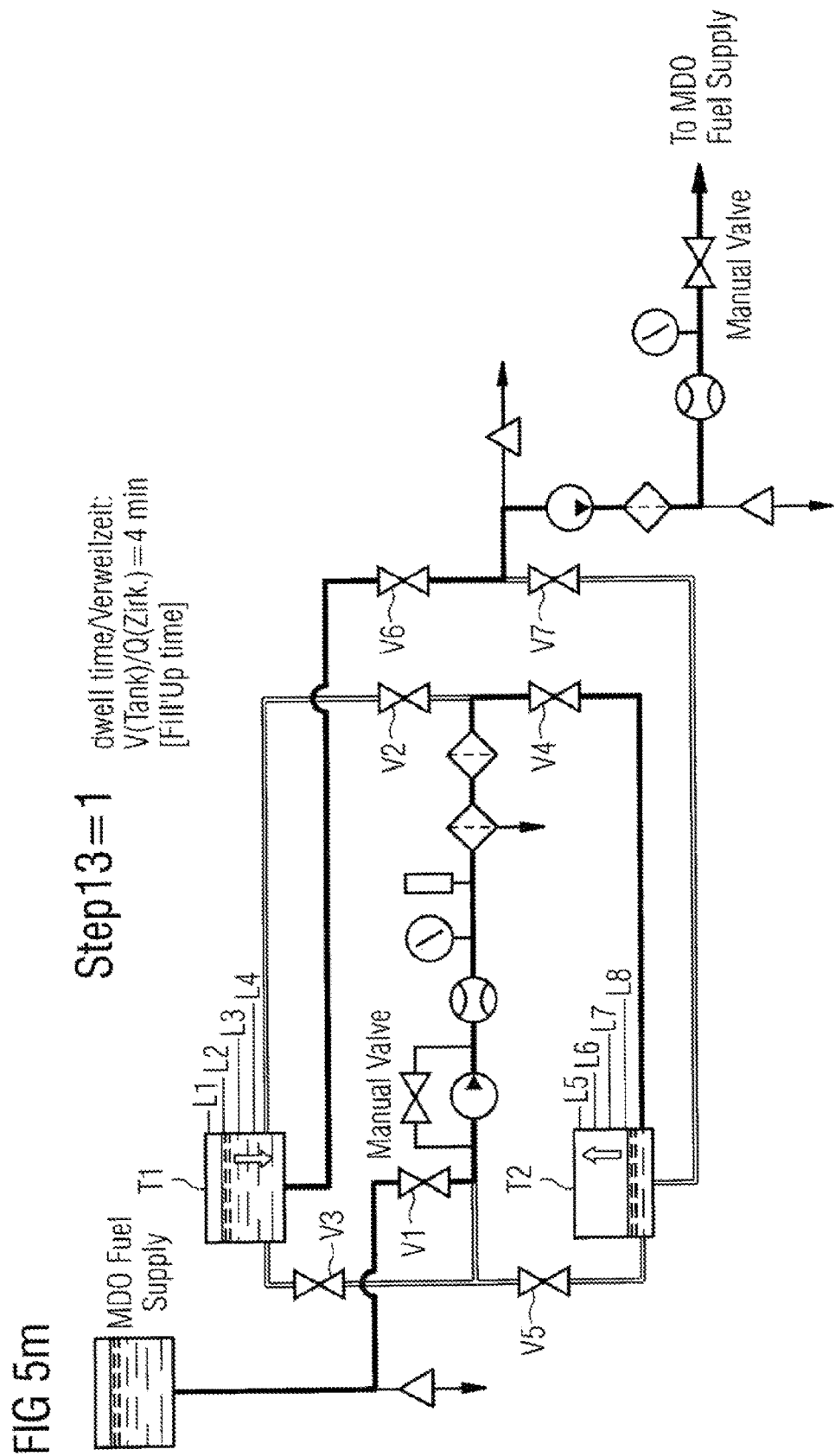

FILTRATION SYSTEM FOR PROVIDING CLEAN FUEL

CLAIM FOR PRIORITY

This application is a U.S. National Phase entry under 35 U.S.C. § 371 from PCT International Application No. PCT/EP2013/000555, filed Feb. 26, 2013, which claims benefit of priority of European Patent Application No. 12162269.0, filed Mar. 29, 2012, all of which are incorporated herein by reference.

TECHNICAL FIELD

The present disclosure generally refers to a filtration system, and particularly to a filtration system configured to provide clean fuel of a desired contamination level, e.g., cleaned marine diesel fuel or marine diesel oil (MDO) originally contaminated. The present disclosure further refers to a movable filter module including such a filtration system, and a method for cleaning contaminated fuel.

BACKGROUND

Large diesel fuel engines for use in ships or power plants may use the technology of "pilot injection". This technology may be used to lower engine noise. In such a case, the engine's electronic control unit can inject a small amount of diesel just before the main injection event, thus reducing its explosiveness in vibration, as well as optimizing injection time and quantity of variations in fuel quality, cold starting and so on. In some fuel systems like advanced common rail fuel systems as many as five or more injections per stroke may be used as "pilot injections".

In order to insure that such large combustion engines in ships or power plants as well as in mechanical processing facilities operate for long periods of time without problems and interruptions, the fuels have to fulfil defined quality and cleanliness requirements, particularly the fuels used for the pilot injections. Fuels such as diesel fuel or marine diesel fuel are often contaminated with particles. Solid contamination is recognized as the main reason for the failure of injection nozzles and of early decay in fuel systems. Even if it is impossible to eliminate completely any contaminations, proper filter devices can be used to control most contaminations. The contamination level may be measured by counting the number of particles of a certain dimension per unit of volume of the fluid. This numbers then are classified in contamination classes, according to international standards, like ISO 4406:1999 or similar standards like SAE or NAS. Due to the fact that even diesel fuel or marine diesel fuel used in such large combustion engines for normal injections, as well as pilot injections, have a purity rate or cleanliness which is not acceptable for the injection equipment, the diesel fuel must be filtered.

In a worst case scenario the diesel fuel delivered fulfils only the contamination class ISO 25. For the injection equipment the contamination class ISO 11 may be acceptable only. That means the number of particles per 100 ml in the original fuel is more than 2.000.000, but the number of particles per 100 ml has to be reduced to 1.000 up to 2.000 at the maximum.

The necessary filtration of the diesel fuel may be conducted by a sequence of filters ("one pass filtration systems"). That sequence of filters might be cost-intensive and requires intensive maintenance work due to the often necessary filter exchanges. In addition, regular one pass filtration systems may need a lot of space. Further, it might be problematic to clean continuously the diesel fuel during operation of the engine. If a filter exchange is necessary normal operation of the internal combustion engine may not be possible.

Various devices for supplying and/or purifying fuel are known, for example, from JP 58 155263 A, JP 2009 241903 A, JP 11 200973 A, JP 58 059360 A, JP 62 051750 A, and EP 2 157 014 A.

U.S. Pat. No. 5,078,901 A shows a system for the automatic removal of contaminants such as water from the fuel supply of an internal combustion engine of the type including an auxiliary fuel tank. The system is automatically controlled and responsive to send contaminant levels in a contaminant removal mechanism and employs an existing fuel transfer pump to direct fuel around the auxiliary fuel tank through the contaminant removal mechanism. The pump additionally operates to provide a continuous supply of fuel to the engine to keep it operating while simultaneously permitting the discharge of contaminants from the contaminant removal mechanism when a predetermined maximum contaminant level has been reached. During normal operation fuel to be burned in the engine is drawn from the auxiliary fuel tank and the fuel decontamination mechanism. On its way to the engine from the auxiliary tank the fuel must pass through the fuel decontamination mechanism. In a start up mode fuel is caused to flow to bypass the auxiliary fuel tank. Accordingly, an exchange of a filter in the fuel decontamination mechanism is not possible during the normal operation.

Another system for cleaning contaminated fuel in a fuel tank is shown in U.S. Pat. No. 5,336,418 A. This known system for cleaning contaminated fuel in a fuel tank comprises a suction line introduced to substantially the lower most part of the tank for suctioning of free water and heavy contaminants settled in the tank. The materials are then rooted via suction through a first strainer, the free water and contaminants are trapped and retrieved. The filtrate then moves to a separation vessel, whereby the fuel is filtered through a primary filter medium, and the contaminants that settle to the bottom of the vessel are collected. The filtered fuel is then rooted to a tertiary filter before being returned to the fuel tank. The filtered fuel is discharged at the bottom of the tank with high velocity to stir up contaminants and facilitate their removal by the suction side of the system. This closed loop process is continued until the filtered fuel is substantially free of contaminants. Again, the closed loop filtering system does not provide the possibility to obtain continuously clean fuel when a filter exchange is necessary.

U.S. Pat. No. 7,681,556 B2 refers to a fuel supply system for use in heavy construction/force equipment including a primary fuel tank and a secondary fuel tank. The fuel supply lines of the two primary and secondary fuel tanks are connected in parallel to each other and are connected to a water separator.

U.S. Pat. No. 6,485,636 B1 shows a common usage of the diesel engines. The fuel filtration system allows the operator to keep the diesel engine running while inspecting a replacing one of the two fuel filters.

A fuel delivery system for multi-fuel engines is known from U.S. Pat. No. 7,546,835 B1. It provides the possibility to transfer at least some fuel from a first fuel storage region to a second fuel storage region via a pump during a first condition. At least some fuel is strained from the second fuel storage region to the first storage fuel region via gravity during a second condition. Fuel from the first fuel storage region is delivered to a first fuel injector of a cylinder of the internal combustion engine and fuel from the second fuel storage region is delivered to the second fuel injector of the cylinder. A similar system is known from U.S. Pat. No. 7,845,334 B2.

US 2010/0193415 A1 shows a fuel filtration device including a first filter normally used to filter foreign substances in fuel and a second filter used to filter foreign substances in fuel only in a state where a degree of blocking of the first filter is larger than the predetermined level. A regulating device is provided for regulating a flow of fuel through the second filter. The regulating device shall enable the flow of fuel through a second filter to permit the filtering of foreign substances through the second filter when the degree of blocking of the first filter is larger than the predetermined level.

Another dual fuel filtration system is known from U.S. Pat. No. 4,427,545 A.

U.S. Pat. No. 5,336,396 A shows a fuel management system for blending of an alternative fuel such as waste oil with a conventional fuel and for continuously filtering that fuel blend before delivery to the fuel injection system of a conventional diesel engine.

The present disclosure is directed, at least in part, to improving or overcoming one or more aspects of prior systems.

SUMMARY OF THE DISCLOSURE

In a first aspect the present disclosure refers to a filtration system configured to be connected to a main fuel tank for storing contaminated fuel and to be connected to a fuel supply of a combustion engine of an electric power plant or a large vessel. The filtration system may comprise a filtration circuit including a first auxiliary fuel tank for containing contaminated fuel, at least one filter, and a first fuel pump configured to pump fuel from the first auxiliary fuel tank through the filter circuit back to the first auxiliary fuel tank. A second auxiliary fuel tank may be connectable to the first auxiliary fuel tank via a transfer valve. The second auxiliary fuel tank may be configured to receive fuel having a desired contamination level from the first auxiliary fuel tank. A control unit may be configured to control the transfer valve such that the first auxiliary tank is fluidly connected to the second auxiliary fuel tank only if fuel of a desired contamination level is contained in the first auxiliary tank. The control unit may also be configured to control a connection of the second auxiliary fuel tank to the fuel supply of a combustion engine only if fuel of the desired contamination level is contained in the second auxiliary tank.

In another aspect the present disclosure refers to a filtration system configured to be connected to a main fuel tank storing contaminated fuel. The filtration system may be configured to be connected to a fuel supply line of a combustion engine of an electric power plant or a large vessel. Such a filtration system may comprise a joint filtration section including a fuel pump and at least one filter. A first auxiliary fuel tank may be connectable to the main fuel tank for receiving fuel and to said joint filtration section such that fuel from the first auxiliary fuel tank may repeatedly circulates through said filtration section and back to the first auxiliary fuel tank to achieve a desired contamination level. A second auxiliary fuel tank may be connectable to the main fuel tank for receiving fuel and to said joined filtration section such that fuel from the second auxiliary fuel tank may repeatedly circulates through the joint filtration section and back to the second auxiliary fuel tank to achieve a desired contamination level. A control unit may be configured to connect one of the first and second auxiliary fuel tanks to the fuel supply only if fuel contained in the one of the first and second auxiliary fuel tanks has achieved the desired contamination level, and, simultaneously, to connect the other of the first and second auxiliary fuel tanks to the filtration section.

Another aspect of the present disclosure refers to a method for cleaning fuel. The method may comprise the step of filling a first auxiliary fuel tank with contaminated fuel, repeatedly circulating the fuel from the first auxiliary fuel tank through at least one fuel filter and back to the first auxiliary fuel tank to achieve a desired contamination level, and guiding fuel having the desired contamination level from the first auxiliary fuel tank to a separate second auxiliary fuel tank. The method may further comprise the step of supplying fuel having the desired contamination level from the second auxiliary fuel tank to a fuel supply of the combustion engines simultaneously with the step of repeatedly circulating the contaminated fuel from the first auxiliary fuel tank through the at least one filter fuel filter and back to the first auxiliary fuel tank.

Another aspect of the present disclosure may refer to a method for cleaning fuel comprising filling one of first and second auxiliary fuel tanks with contaminated fuel. The fuel may be circulated through at least one fuel filter and back to the one of the first and second auxiliary fuel tanks to achieve a desired contamination level. Simultaneously fuel having the desired contamination level is guided from the other of the first and second auxiliary fuel tanks to a fuel supply of an combustion engine.

Other features and aspects of this disclosure will be apparent from the following description and the accompanying drawings.

BRIEF DESCRIPTION OF THE DRAWINGS

FIG. 1 shows a first exemplary embodiment of a filtration system according to the present disclosure;

FIG. 2 shows a second exemplary embodiment of a filtration system according to the present disclosure;

FIG. 4a shows a first perspective view of a transportable filtration module comprising a filtration system as shown in FIG. 1; and FIG. 4b shows another perspective view of the transportable filtration module of FIG. 1.

FIG. 5a-5m show different operating modes of another exemplary embodiment of a filtration system according to the present disclosure.

DETAILED DESCRIPTION

Figure 3A:
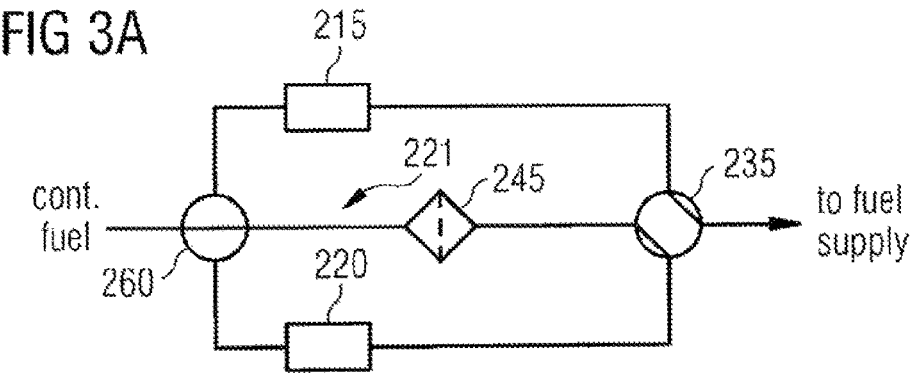
FIG. 3A shows a schematic diagram of exemplary valve positions of the filtration system of FIG. 2.
Figure 3B:
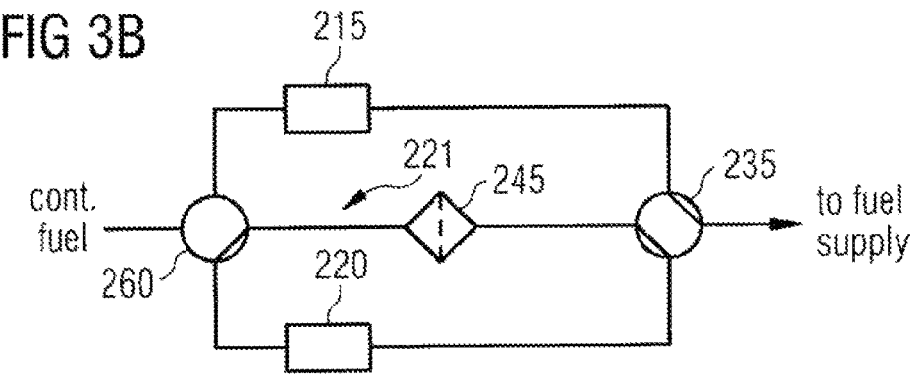
FIG. 3B shows another schematic diagram of exemplary valve positions of the filtration system of FIG. 2.

FIG. 1 shows a first exemplary embodiment of a filtration system 5 according to the present disclosure. The filtration system 5 may comprise a first auxiliary fuel tank 15 connectable via a valve 120 and pipe 140 to a main fuel tank 10. A pressure gauge 100 may be coupled to pipe 140 for measuring the pressure of fuel flowing therein. In addition, a cleanliness measuring device 105 may be coupled to pipe 140 for counting the number of particles within fuel flowing in pipe 140, i.e. of the contaminated fuel contained in main tank 10.

First auxiliary fuel tank 15 may be part of a filtration circuit 16. Filtration circuit 16 may comprise at least first auxiliary fuel tank 15 and at least one filter as for example a duplex filter 30 and/or an auto filter 35. In another exemplary embodiment the filtration circuit 16 may further comprise a flow meter 25 and a fuel pump 40. A fuel line 145 may connect first auxiliary tank 15 to flow meter 25. A fuel line 150 may connect flow meter 25 to duplex filter 30. A fuel line 155 may connect auto filter 35 to fuel pump 40. A fuel line 160 may connect fuel pump 40 to first auxiliary tank 15.

Optionally, a fuel cleanliness measuring device 50 may connect to fuel line 160 for measuring the cleanliness of fuel sucked by pump 40 out of first auxiliary tank 15. A pressure gauge 45 may be provided at fuel line 155 for measuring the pressure within the fuel line 155. A temperature gauge 110 may be coupled to first auxiliary fuel tank 15 for measuring the temperature of fuel contained therein. A fuel level sensor 17 (or high and low fuel level sensors) may be provided at first auxiliary tank 15 for measuring the level of fuel within first auxiliary fuel tank 15.

A second auxiliary fuel tank 20 may be connectable to first auxiliary fuel tank 15 via a transfer valve 135. A fuel line 165 may connect second auxiliary fuel tank 20 to a fuel pump 60. A fuel line 170 may connect fuel pump 60 and a duplex filter 65. A further fuel line 175 may connect duplex filter 65 to a flow meter 70. Further, a fuel supply (not shown) connected to a combustion engine (not shown) might be connectable to fuel line 175 via a valve 126.

Optionally, a pressure gauge 80 and/or temperature gauge 90 and/or a fuel cleanliness measuring device 125 may be coupled to fuel line 175. A fuel line 180 may connect flow meter 70 to main fuel tank 10. In addition, a cleanliness measuring device 130 may be provided for measuring the number of particles of fuel leaving secondary fuel tank 20.

A control unit 132 may be provided. Control unit 132 may be coupled to at least one of the following components: one or more level sensor (not shown) at main fuel tank 10, valve 120, level sensor(s) 17, level sensor(s) 18, transfer valve 135, cleanliness measuring device 130, pump 60, pressure gauge 45, cleanliness measuring device 50, flow meter 25, temperature gauge 90, flow meter 70, valve 126, pump 40, filter pressure sensors, etc.

FIG. 2 shows another exemplary embodiment of the present disclosure, i.e. a filtration system 205. Filtration system 205 may comprise a first auxiliary fuel tank 215, a second auxiliary fuel tank 220 and a filtration section 221. Filtration section 221 may comprise a first fuel pump 250, an auto filter 245, a duplex filter 240, and two valves 235, 260. A shut-off valve 255 may also be provided.

Valves 235, 260 may be designed such that various fuel distribution positions may be provided. Further exemplary details of these valves 235, 260 are shown in FIGS. 3A and 3D. The various operation states of valves 235, 260 are explained in more detail below.

A fuel line 324 may connect valve 260 to first auxiliary fuel tank 215. First auxiliary fuel tank 215 may be provided with a fuel level sensor 216 for measuring the level of fuel contained in first auxiliary fuel tank 215. A fuel line 330 may connect first auxiliary fuel tank 215 to flow meter 223. A valve 217 may be provided within said fuel line 330. Another fuel line 335 may connect a valve 230 to flow meter 223. A fuel line 340 may connect valve 230 to valve 235. A cleanliness measuring device 334 may be provided. Cleanliness measuring device 334 may be connected to valve 230 for measuring the number of particles within fuel lines 335, 340. Fuel lines 345, 355, 360 may form a connection between valves 235, 260 and the various components of filtration section 221.

A fuel line 380 may connect second auxiliary fuel tank 220 to valve 260. A fuel line 370 may connect the second auxiliary fuel tank 220 to valve 235. A fuel level measuring device 222 may be coupled to second auxiliary fuel tank 220 for measuring the level of fuel contained therein. Another cleanliness measuring device 309 may be coupled to fuel pipe 319 for measuring the number of particles of contaminated fuel flowing from main tank 210 to one of the first and second auxiliary tanks 215, 220 via valve 260.

Another fuel line 271 may connect to valve 235 and a fuel pump 280 via another shut-off valve 270. A further cleanliness measuring device 305 may be coupled to fuel line 271 for measuring the cleanliness of fuel leaving one of the first and second auxiliary fuel tanks 215, 220 via valve 235 and fuel line 271. Another fuel line 272 may connect via a further filter 285 to a flow meter 290. Flow meter 290 may connect to a valve 295 via another fuel line 273. Valve 295 may connect to a fuel supply (not shown) of a combustion engine (not shown) via a fuel line 274. A pressure gauge 299 may be provided for measuring the pressure of fuel within fuel line 273. A further cleanliness measuring device 298 may be coupled to fuel line 272 downstream of filter 285.

A control unit 232 may be provided for controlling various components of the filtration system 205 as outlined above. Control unit 232 may be coupled to first fuel level measuring device 216, second fuel measuring device 222, valve 260, valve 235, and possibly other components such as cleanliness measuring devices 334, 305, 298 as well as pressure gauges 299, 389 and the other valves 230 etc. as well as flow meters 290, 223.

In addition, filtration systems 5, 205 as shown FIGS. 1 and 2 and explained in detail above, may be housed within a transportable or movable module 300 to be connected to the main tank 10, 210 and a fuel supply of the combustion engine.

FIG. 4a shows a perspective view of such a filtration module 300, which may comprise support means such as a support frame 310 and the main components including first and second auxiliary fuel tanks 15, 20, filtration circuit 16 and pump 40 and/or pump 60.

FIG. 4b shows the filtration module 300 of FIG. 4a from another perspective. As may be seen from FIGS. 4a, 4b, the support frame 310 may form a horizontal slot 320 by which the whole filtration module 300 may be lifted by means of a forklift truck and be transported to another location. The support frame 310 may form different height levels, as for example indicated by adjustable mounting brackets 325, for putting on/mounting the components of filtration systems 5, 205 according to FIGS. 1 and 2.

INDUSTRIAL APPLICABILITY

Filtration systems as described herein may be designed such that fuel is repeatedly passing at least one filter, or a series of filters, while a defined contamination level (e.g. contamination class ISO 11) is achieved. Due to the fact that the first and second auxiliary fuel tanks are provided clean fuel can be supplied to the fuel supply including injectors of the combustion engine, and, simultaneously, contaminated fuel can be repeatedly filtered.

A filtration system according to the present disclosure may be configured to provide clean fuel of a desired contamination level as cleaned marine diesel fuel or marine diesel oil (MDO) originally contaminated, even if the fuel shall pass at least one filter several times while the fuel has a desired contamination level, and/or if simultaneously a filter exchange is necessary.

A method according the present disclosure may include supplying cleaned fuel to a fuel system of a combustion engine and simultaneously circulating contaminated fuel through at least one fuel filter several times before the cleaned fuel is being supplied to the fuel system of the combustion engine, in which the fuel is burned.

Accordingly, the filtration system 5 as shown in FIG. 1 may operate as follows. Contaminated fuel contained in main tank 10 may flow into first auxiliary tank 15 if control unit 132 opens valve 120. During filling of first auxiliary fuel tank 15 the cleanliness of this contaminated fuel may be measured via cleanliness measuring device 105. If the level of fuel within first auxiliary fuel tank 15 reaches a maximum level, measured via the first fuel level sensor 17, valve 120 may be closed via control 132. Transfer valve 135 is still closed. Accordingly, no contaminated fuel within first fuel tank 15 may flow into second auxiliary fuel tank 20.

As soon as the maximum fuel level within first auxiliary fuel tank 15 is reached, or even before, pump 40 may be started via control unit 132. Consequently, fuel from first auxiliary fuel tank 15 may be pumped by pump 40 through filters 35, 30 back to first auxiliary fuel tank via various fuel lines 160, 155, 150, 145. Accordingly, fuel in first auxiliary fuel tank 15 may repeatedly pass filters 35, 30. During this pumping operation the cleanliness of fuel leaving first auxiliary fuel tank 15 may be measured via cleanliness measuring device 50. This circulation of contaminated fuel is continued while the cleanliness of fuel reaches a desired contamination level.

If the desired contamination level of fuel within first auxiliary tank 15 is reached, control unit 132 opens valve 135. Accordingly, clean fuel flows in second auxiliary fuel tank 20. Valve 135 is shut by control unit 132 once all fuel from first auxiliary tank 15 has flowed into second auxiliary fuel tank 20.

Subsequently, pump 60 pumps fuel out of second auxiliary fuel tank 20 via fuel line 170, filter 65 and opened valve 126 to a fuel supply (not shown) of a combustion engine (not shown). The cleanliness of this fuel leaving second auxiliary fuel tank 20 is measured by cleanliness measuring device 130 and cleanliness measuring device 125. Excess fuel may be guided back to main tank 10 via flow meter 70 and fuel line 180.

While clean fuel flows from the secondary auxiliary fuel tank 20 to the fuel supply of the engine, valve 120 is opened again and, accordingly, first auxiliary fuel tank 15 is filled with contaminated fuel from main tank 10. The filtration operation via filters 35, 30 is started again (as described above) and simultaneously clean fuel from second auxiliary fuel tank 20 is supplied to the fuel supply.

The volumes of first and second auxiliary fuel tanks 15, 20 may be chosen such that clean fuel can be delivered from second auxiliary fuel tank 20 to the fuel supply of the combustion engine while contaminated fuel stored within first auxiliary fuel tank 15 repeatedly passes through the filtration circuit 16. This should lead to the fuel circulating through the filtration circuit achieving the desired contamination level, for example ISO 11 or other cleanliness.

Filtration system 205 as shown in FIG. 2 may operate as follows. The following description also refers to FIGS. 3a-3d showing various phases of the operation of the filtration system 205. For simplification, FIGS. 3a-3d include only main components of the filtration system 205 shown in FIG. 2 in more details.

As indicated in FIG. 3A, first auxiliary fuel tank 215 may contain clean fuel having already been circulated through the filters and thus having a desired contamination level. Accordingly, a fuel supply (not shown) of a combustion engine (not shown) may already be connected through valve 235 to the first auxiliary fuel tank 215. Clean fuel passes via valve 235 to a fuel supply line connected to the fuel supply of the combustion engine. Consequently, clean fuel is supplied to the fuel supply of the combustion engine and may be burnt therein. Simultaneously, second auxiliary fuel tank 220 is being filled with contaminated fuel from main tank 210. For this purpose, valve 260 connects main tank 210 (see e.g. FIG. 2) to filtration section 221. Additionally, valve 235 provides a connection between first auxiliary fuel tank 215 and the fuel supply, and it further provides a connection between filtration section 221 and second auxiliary fuel tank 220.

The positions of valves 235, 260 are maintained while the second auxiliary fuel tank 220 is being filled with contaminated fuel. As indicated in FIG. 3a, the contaminated fuel passes filter section 221 already once before it flows in second auxiliary fuel tank 220. While auxiliary fuel tank 220 is filled with contaminated fuel, clean fuel having a defined contamination level flows from first auxiliary fuel tank 215 to the fuel supply of the combustion engine.

When second auxiliary fuel tank 220 is filled with contaminated fuel up to a defined maximum filling level, valve 260 is controlled such that a connection is provided between second auxiliary fuel tank 220 and filtration section 221. Valve 235 maintains its position according to FIG. 3B. Consequently, the contaminated fuel in second auxiliary fuel tank 220 may repeatedly circulate in filtration section 221 while a predefined contamination level of fuel in second auxiliary fuel tank 220 is reached. Simultaneously, clean fuel from first auxiliary fuel tank 215 may be continuously supplied to the fuel supply.

Figure 3C:
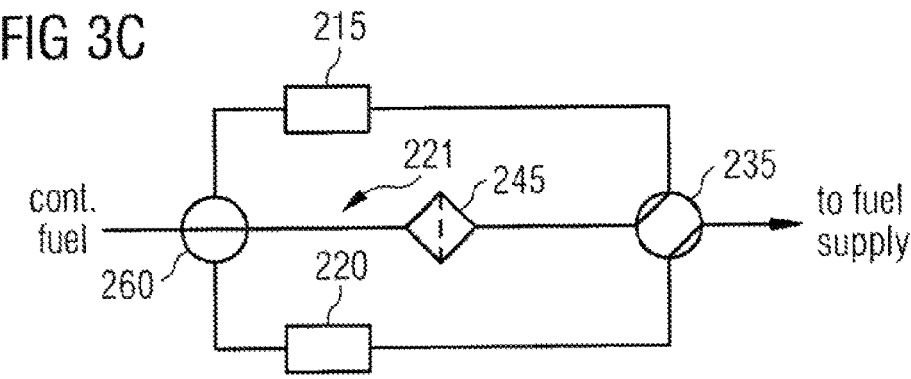
FIG. 3C shows another schematic diagram of exemplary valve positions of the filtration system of FIG. 2.
Figure 3D:
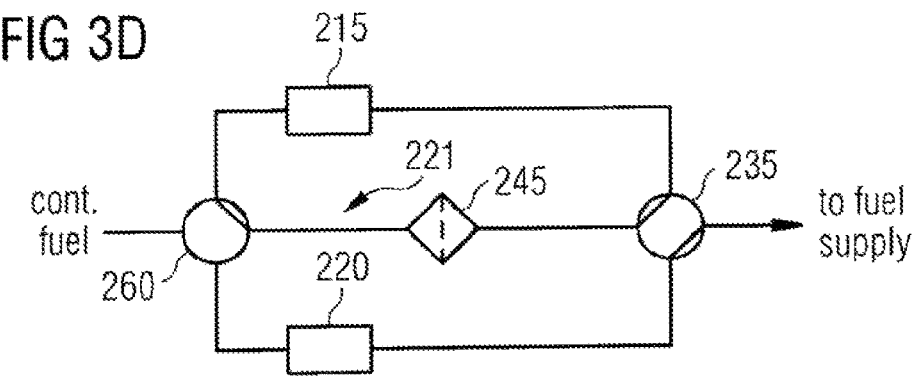
FIG. 3D shows a schematic diagram of exemplary valve positions of the filtration system of FIG. 2.

When the fuel in second auxiliary fuel tank 220 has the desired contamination level and the fuel level in first auxiliary fuel tank 215 reaches a low level, positions of valves 235 and 260 change, as indicated in FIG. 3c. Accordingly, first auxiliary fuel tank 215 is disconnected from the fuel supply line and connects to filtration section 221. In addition, filtration section 221 connects to main tank 210. Furthermore, second auxiliary fuel tank 220 connects to the fuel supply line connected to the fuel supply. Consequently, clean fuel from second auxiliary fuel tank 220 may be supplied to the fuel supply and can be burnt in the combustion engine connected thereto. Simultaneously, contaminated fuel from the main tank 210 may flow via the filtration section 221 into the first auxiliary fuel tank 215 while a maximum level is reached in first auxiliary fuel tank 215.

When a maximum level in first auxiliary fuel tank 215 is reached, the position of valve 260 is changed again such that a closed loop may be created so that the first auxiliary fuel tank 215 connects to filtration section 221 (see FIG. 3d). Accordingly, contaminated fuel in first auxiliary fuel tank 215 may repeatedly circulate through filtration section 221 while a predetermined contamination level is reached. Simultaneously, as shown in FIG. 3d, clean fuel from second auxiliary fuel tank 220 may be supplied to the fuel supply via valve 235.

When the fuel in first auxiliary fuel tank 215 reaches the desired contamination level and the fuel in second auxiliary fuel tank 220 reaches a defined low fuel level, the positions of valve 235 are changed again to the positions shown in FIG. 3a. Consequently, the process starts again as explained above with reference to FIGS. 3a-3d.

Figure 5A:
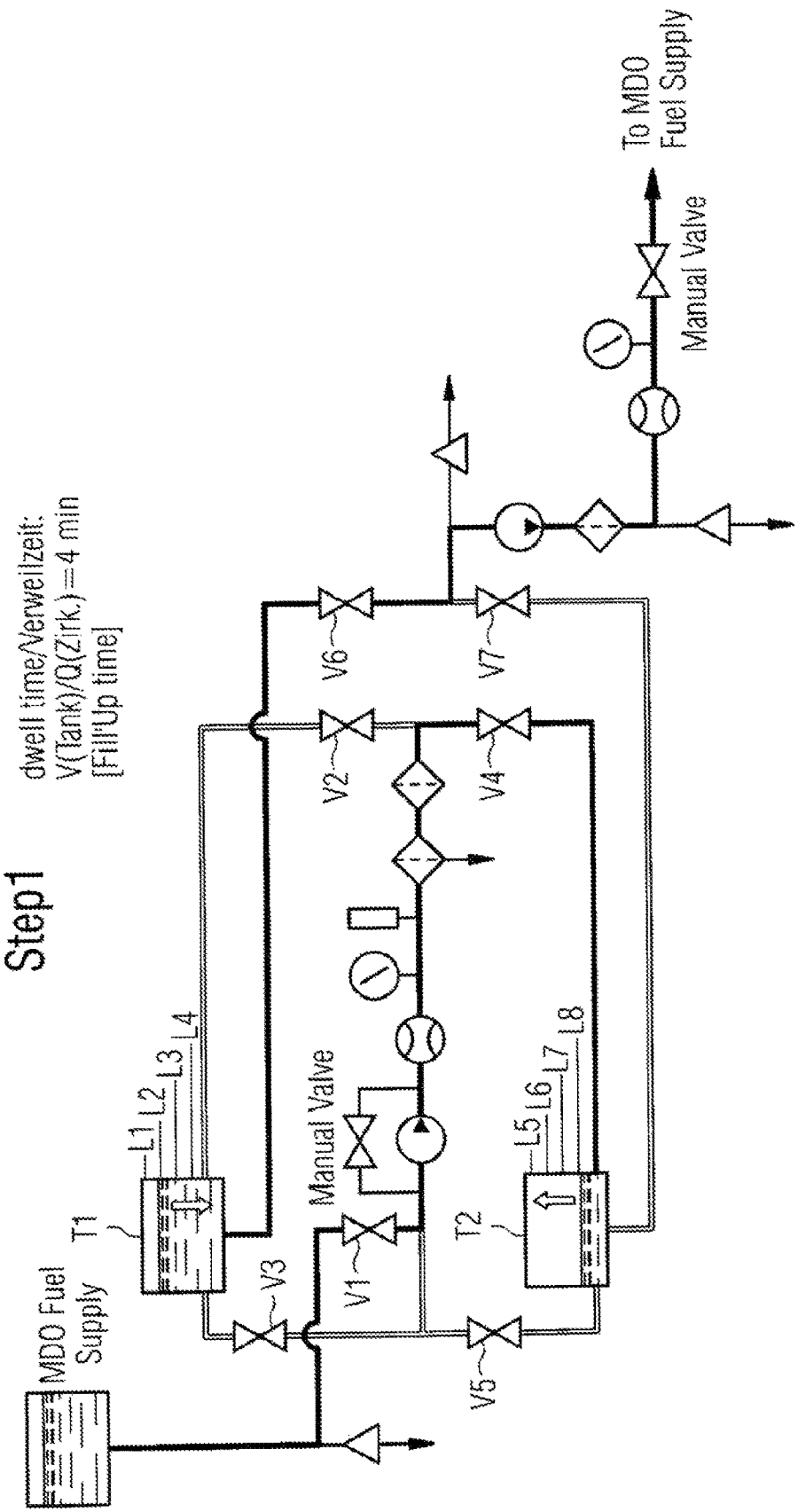
Figure 5B:
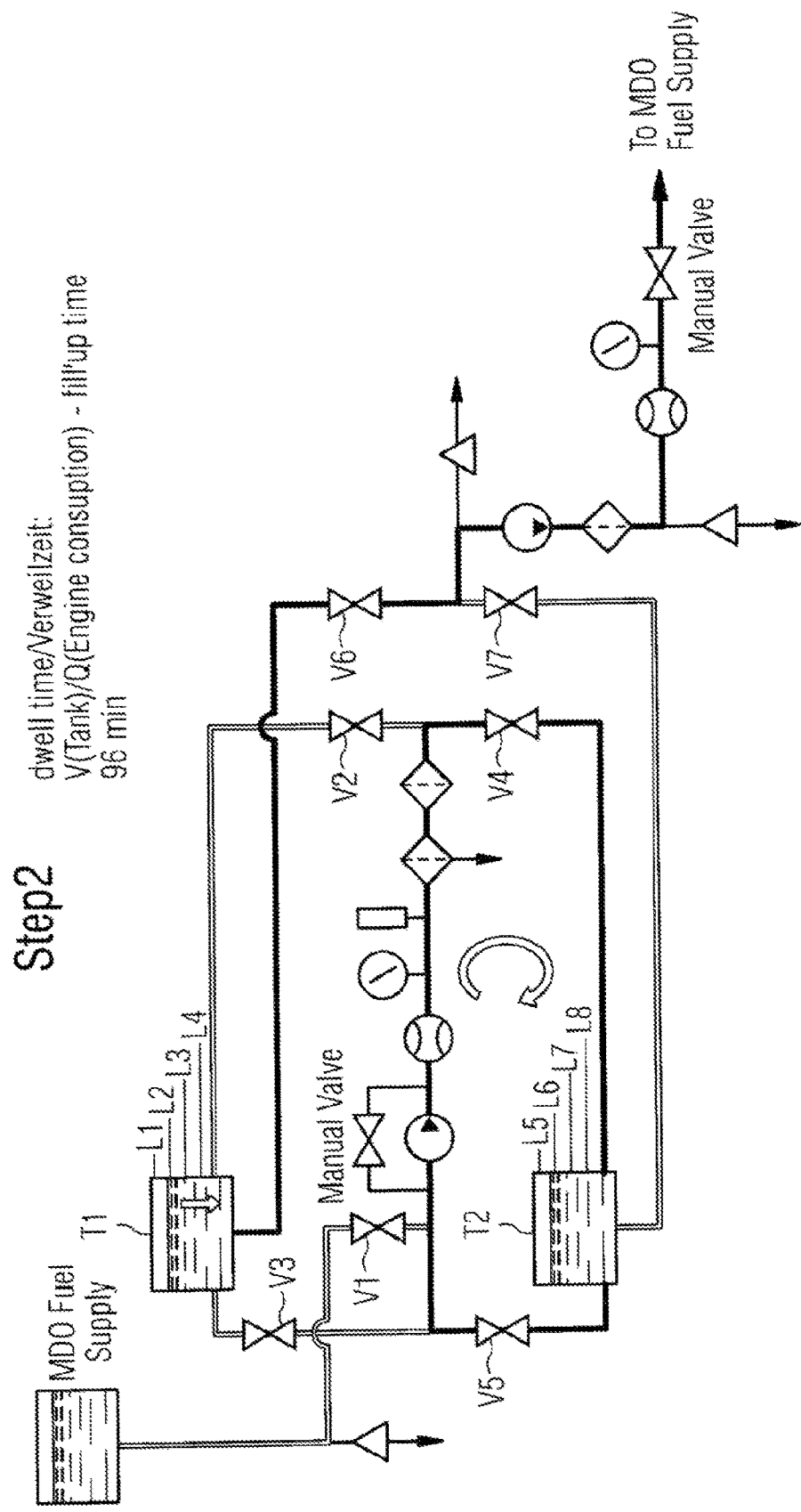
Figure 5E:
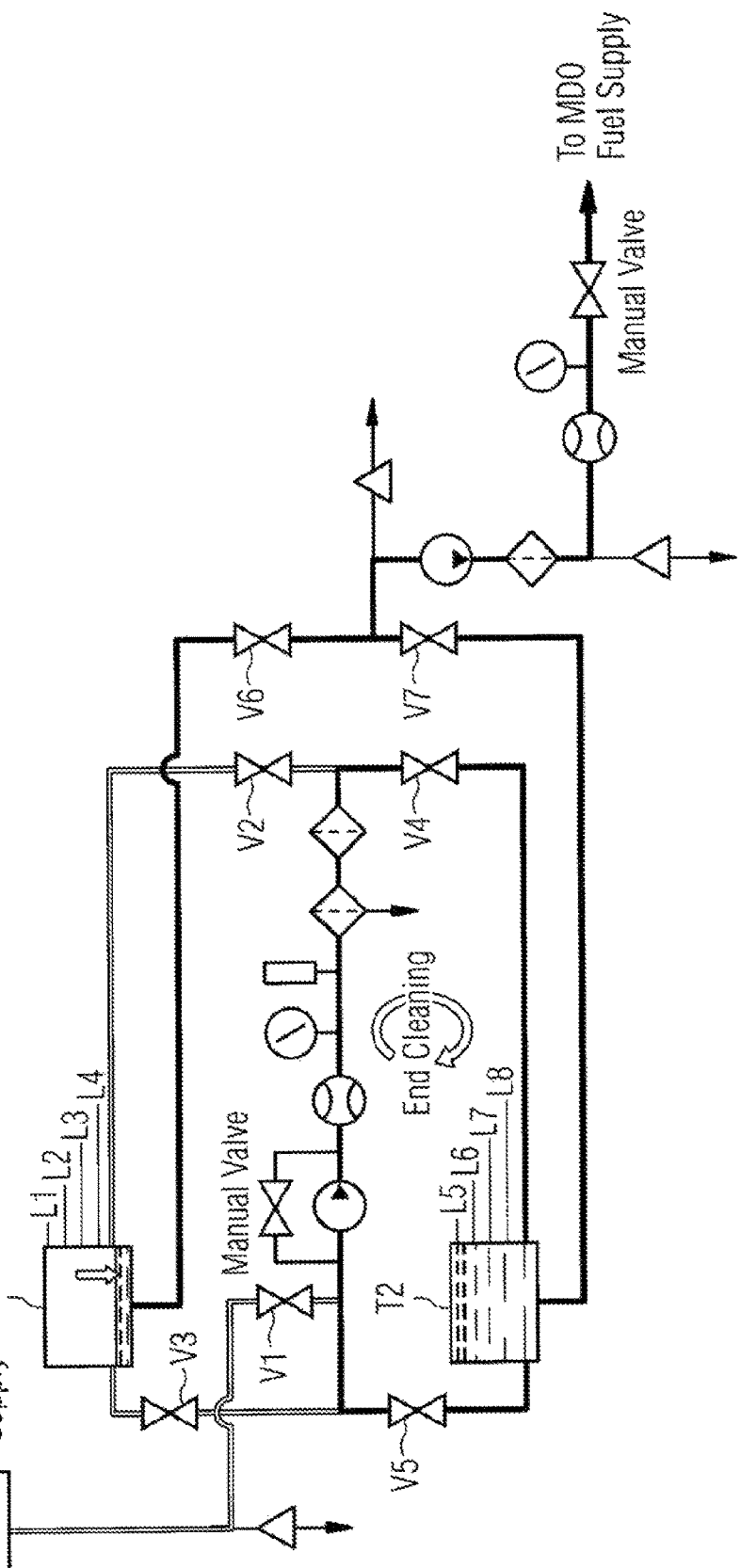

Another exemplary embodiment of a filtration system according to the present disclosure is shown in FIGS. 5a-5m showing different operating modes. The sequence of different operating modes of the exemplary filtration system starts normally with the operating mode shown in FIG. 5a. and ends with that shown in FIG. 5l; step 13 shown in FIG. 5m corresponds to that shown in FIG. 5a.

In step 1 tank T2 is being filled. Tank T1 is filled with cleaned fuel.

In step 2 the filtration circuit including tank T2 is separated from the filtration circuit including tank T1 and fuel within the filtration circuit including tank T2 circulates several times through the filtration circuit and is being filtrated thereby. Simultaneously, cleaned fuel from Tank T1 is supplied to the engine. This operating mode ends in step 4. At that time, fuel has obtained the desired contamination level.

In step 5 the filtration circuit including tank T2 is connected to the fuel supply of the engine and in step 6 the tank T1 is disconnected from the fuel supply of the engine.

Now, in step 7 tank T1 is started to be filled with contaminated fuel and cleaned fuel from tank T2 is supplied to the engine.

As soon as tank T1 is full, the filtration circuit including now tank T1 is separated from the MDO fuel tank and the cleaning process is started by circulating the contaminated fuel in the filtration circuit including tank T1. This process ends in step 10. At that time, fuel in tank T1 has obtained the desired contamination level.

Now, in step 11, tank T1 is connected to the engine, and in step 12 tank T2 is disconnected from the engine.

As already mentioned, in step 13 the process starts again.

The contamination level might be defined according to ISO 4406:1999 or similar standards such as SAE or NAS. As an exemplary example, the at least one filter might be a BOLL Automatic Filter TYPE 6.72 or BOLLFILTER TYPE BFD (duplex filter) as distributed by the company BOLL & Kirch Filterbau GmbH, Germany. Generally, "auto filter" means a filter of the self-cleaning type. "duplex filter" may mean that the filter included at least two filter elements such that if one filter element has to be cleaned or replaced, the other filter elements may still operates, i.e. fuel can be filtered.

Valves mentioned above might be suitable valves of any type fulfilling the requirements mentioned above including for example switch-over ball valves or the like.

Although the preferred embodiments of this invention have been described herein, improvements and modifications may be incorporated without departing from the scope of the following claims.

The invention claimed is:

1. A filtration system configured to be connected to a main fuel tank for storing contaminated fuel and to be connected to a fuel supply of a combustion engine, the filtration system comprising:
a filtration circuit including a first filter, a first auxiliary fuel tank for containing fuel, a cleanliness measuring device that is fluidly coupled to a fuel flow passage of the filtration circuit, and a first fuel pump configured to pump the fuel from the first auxiliary fuel tank through the filtration circuit and back to the first auxiliary fuel tank;
a second auxiliary fuel tank in selective fluid communication with said first auxiliary fuel tank via a transfer valve for receiving fuel from said first auxiliary fuel tank via the transfer valve, the second auxiliary fuel tank being fluidly coupled in series between the first auxiliary fuel tank and the fuel supply of the combustion engine to provide fuel to the combustion engine; and
a control unit operatively coupled to the transfer valve and the cleanliness measuring device, the control unit being configured to
receive a cleanliness signal from the cleanliness measuring device that is indicative of a level of cleanliness of the fuel within the filtration circuit,
compare the cleanliness signal to a desired contamination level, and
open the transfer valve to effect fluid communication between the first auxiliary fuel tank and the second auxiliary fuel tank via the transfer valve in response to the cleanliness signal meeting the desired contamination level.

2. The filtration system of claim 1, further comprising at least one of
a first level sensor configured to measure a level of fuel within the first auxiliary fuel tank, and
a second level sensor configured to measure a level of fuel within the second auxiliary fuel tank.

3. The filtration system of claim 1, wherein the control unit is also operatively coupled to the first fuel pump, and wherein the control unit is further configured to control the first fuel pump such that the fuel repeatedly circulates within the filtration circuit for improving the cleanliness of the fuel.

4. The filtration system of claim 1, further comprising a second fuel pump arranged downstream of the second auxiliary fuel tank, such that the second auxiliary fuel tank is fluidly coupled to the fuel supply of the combustion engine via the second fuel pump, the second fuel pump being configured to pump fuel from the second auxiliary fuel tank to the fuel supply of the combustion engine.

5. The filtration system of claim 1, further comprising a second filter arranged within a fuel supply line that extends from the second auxiliary fuel tank to the fuel supply of the combustion engine.

6. A filtration system configured for connection to a main fuel tank for storing contaminated fuel and to a fuel supply of a combustion engine, the filtration system comprising:
a filtration section including a first fuel pump, a cleanliness measuring device that is fluidly coupled to a fuel flow passage of the filtration section, and at least one filter;
a first auxiliary fuel tank in selective fluid communication with the main fuel tank for receiving fuel from the main fuel tank, the filtration section, and the fuel supply of the combustion engine;
a second auxiliary fuel tank in selective fluid communication with the main fuel tank for receiving fuel from the main fuel tank, the filtration section, and the fuel supply of the combustion engine; and
a control unit operatively coupled to at least one valve and the cleanliness measuring device, the control unit being configured to
receive a cleanliness signal from the cleanliness measuring device that is indicative of a level of cleanliness of the fuel within the filtration section,
compare the cleanliness signal to a desired contamination level,
control the at least one valve to simultaneously
effect fluid communication between the first auxiliary fuel tank and the filtration section, block fluid communication between the first auxiliary fuel tank and the fuel supply of the combustion engine, effect fluid communication between the second auxiliary fuel tank and the fuel supply of the combustion engine, and block fluid communication between the second auxiliary fuel tank and the filtration section, and associate the cleanliness signal with a cleanliness of fuel within the first auxiliary fuel tank and repeatedly circulate the fuel from the first auxiliary fuel tank through the filtration section in response to the cleanliness of fuel within the first auxiliary fuel tank not meeting the desired contamination level, based on the cleanliness signal.

7. The filtration system of claim 6, further comprising at least one of a first level sensor configured to measure a level of fuel within the first auxiliary fuel tank, and a second level sensor configured to measure a level of fuel within the second auxiliary fuel tank.

8. The filtration system of claim 6, further comprising a second fuel pump arranged downstream of the first fuel pump, the second fuel pump being configured to pump fuel from the first or second auxiliary fuel tanks to the fuel supply of the combustion engine.

9. The filtration system of claim 6, the control unit being further configured to determine that the cleanliness of fuel within the first auxiliary fuel tank meets the desired contamination level, based on the cleanliness signal;

in response to the cleanliness of fuel within the first auxiliary fuel tank meeting the desired contamination level, control the at least one valve to simultaneously effect fluid communication between the second auxiliary fuel tank and the filtration section, block fluid communication between the second auxiliary fuel tank and the fuel supply of the combustion engine, effect fluid communication between the first auxiliary fuel tank and the fuel supply of the combustion engine, and block fluid communication between the first auxiliary fuel tank and the filtration section; and associate the cleanliness signal with a cleanliness of fuel within the second auxiliary fuel tank and repeatedly circulate the fuel from the second auxiliary fuel tank through the filtration section in response to the cleanliness of fuel within the second auxiliary fuel tank not meeting the desired contamination level, based on the cleanliness signal.

10. A filter module, comprising:

a support frame; and a filtration system coupled to the support frame, the filtration system being configured for connection to a main fuel tank for storing contaminated fuel and to a fuel supply of a combustion engine, the filtration system comprising:

a filtration section including a first fuel pump, a cleanliness measuring device that is fluidly coupled to a fuel flow passage of the filtration section, and at least one filter;

a first auxiliary fuel tank in selective fluid communication with the main fuel tank for receiving fuel from the main fuel tank, the filtration section, and the fuel supply of the combustion engine;

a second auxiliary fuel tank in selective fluid communication with the main fuel tank for receiving fuel from the main fuel tank, the filtration section, and the fuel supply of the combustion engine; and a control unit operatively coupled to at least one valve and the cleanliness measuring device, the control unit being configured to receive a cleanliness signal from the cleanliness measuring device that is indicative of a level of cleanliness of the fuel within the filtration section, compare the cleanliness signal to a desired contamination level, control the at least one valve to simultaneously effect fluid communication between the first auxiliary fuel tank and the filtration section, block fluid communication between the first auxiliary fuel tank and the fuel supply of the combustion engine, effect fluid communication between the second auxiliary fuel tank and the fuel supply of the combustion engine, and block fluid communication between the second auxiliary fuel tank and the filtration section, and associate the cleanliness signal with a cleanliness of fuel within the first auxiliary fuel tank and repeatedly circulate the fuel from the first auxiliary fuel tank through the filtration section in response to the cleanliness of fuel within the first auxiliary fuel tank not meeting the desired contamination level, based on the cleanliness signal.

11. A method for cleaning fuel, the method comprising:

filling a first auxiliary fuel tank with fuel;

generating a cleanliness signal with a cleanliness measuring device that is fluidly coupled to a flow passage from the first auxiliary fuel tank, the cleanliness signal being indicative of a cleanliness of the fuel from the first auxiliary fuel tank;

comparing, via a controller, the cleanliness signal to a desired contamination level;

circulating the fuel from the first auxiliary fuel tank through at least one fuel filter and back to the first auxiliary fuel tank in response to the cleanliness signal not meeting the desired contamination level;

opening a transfer valve by the controller to transfer fuel from the first auxiliary fuel tank to a second auxiliary fuel tank in response to the cleanliness signal meeting the desired contamination level, the second auxiliary fuel tank being separate from the first auxiliary fuel tank; and supplying fuel from the second auxiliary fuel tank to a fuel supply of a combustion engine simultaneously with the step of circulating the fuel from the first auxiliary fuel tank through the at least one fuel filter and back to the first auxiliary fuel tank.

12. A method for cleaning fuel, the method comprising:

filling a first auxiliary fuel tank with fuel;

generating a first cleanliness signal with a cleanliness measuring device that is fluidly coupled to a flow passage from the first auxiliary fuel tank, the first cleanliness signal being indicative of a cleanliness of the fuel from the first auxiliary fuel tank;

comparing, via a controller, the first cleanliness signal to a desired contamination level;

in response to the first cleanliness signal not meeting the desired contamination level:

effecting fluid communication, by the controller, between the first auxiliary fuel tank and at least one filter, blocking fluid communication, by the controller, between the first auxiliary fuel tank and a fuel supply of a combustion engine, effecting fluid communication, by the controller, between a second auxiliary fuel tank and the fuel supply of the combustion engine, and blocking fluid communication, by the controller, between the second auxiliary fuel tank and the at least one filter;

circulating fuel from the first auxiliary fuel tank through the at least one filter and back to the first auxiliary fuel tank; and in response to the first cleanliness signal meeting the desired contamination level:

effecting fluid communication, by the controller, between the second auxiliary fuel tank and the at least one filter, blocking fluid communication, by the controller, between the second auxiliary fuel tank and the fuel supply of the combustion engine, effecting fluid communication, by the controller, between the first auxiliary fuel tank and the fuel supply of the combustion engine, and blocking fluid communication, by the controller, between the first auxiliary fuel tank and the at least one filter.

13. The filter module of claim 10, wherein the filtration system further includes a second fuel pump arranged downstream of the first fuel pump, such that the second auxiliary fuel tank is fluidly coupled to the fuel supply of the combustion engine via the second fuel pump, and wherein the second fuel pump is configured to pump fuel from the first or second auxiliary fuel tanks to the fuel supply of the combustion engine.

14. The filter module of claim 10, wherein the control unit is further configured to determine that the cleanliness of fuel within the first auxiliary fuel tank meets the desired contamination level, based on the cleanliness signal;

in response to the cleanliness of fuel within the first auxiliary fuel tank meeting the desired contamination level, based on the cleanliness signal, control the at least one valve to simultaneously:

effect fluid communication between the second auxiliary fuel tank and the filtration section, block fluid communication between the second auxiliary fuel tank and the fuel supply of the combustion engine, effect fluid communication between the first auxiliary fuel tank and the fuel supply of the combustion engine, and block fluid communication between the first auxiliary fuel tank and the filtration section; and associate the cleanliness signal with a cleanliness of fuel within the second auxiliary fuel tank and repeatedly circulate the fuel from the second auxiliary fuel tank through the filtration section in response to the cleanliness of fuel within the second auxiliary fuel tank not meeting the desired contamination level, based on the cleanliness signal.

15. The filtration system of claim 1, wherein the cleanliness measuring device is configured to count a number of particles within fuel flowing through the filtration circuit.

16. The filtration system of claim 6, wherein the cleanliness measuring device is configured to count a number of particles within fuel flowing through the filtration section.

17. The filtration system of claim 6, wherein the control unit is further configured to control the at least one valve to simultaneously:

effect fluid communication between the second auxiliary fuel tank and the fuel supply of the combustion engine, block fluid communication between the second auxiliary fuel tank and both the main fuel tank and the filtration section, effect fluid communication between the first auxiliary fuel tank and both the main fuel tank and the filtration section, and block fluid communication between the first auxiliary fuel tank and the fuel supply of the combustion engine.

18. The filtration system of claim 17, wherein the control unit is further configured to control the at least one valve to simultaneously:

effect fluid communication between the first auxiliary fuel tank and the fuel supply of the combustion engine, block fluid communication between the first auxiliary fuel tank and both the main fuel tank and the filtration section, effect fluid communication between the second auxiliary fuel tank and both the main fuel tank and the filtration section, and block fluid communication between the second auxiliary fuel tank and the fuel supply of the combustion engine.

19. The filtration system of claim 9, wherein the control unit is further configured to control the at least one valve to simultaneously:

effect fluid communication between the second auxiliary fuel tank and the fuel supply of the combustion engine, block fluid communication between the second auxiliary fuel tank and both the main fuel tank and the filtration section, effect fluid communication between the first auxiliary fuel tank and both the main fuel tank and the filtration section, and block fluid communication between the first auxiliary fuel tank and the fuel supply of the combustion engine.

20. The filtration system of claim 19, wherein the control unit is further configured to control the at least one valve to simultaneously:

effect fluid communication between the first auxiliary fuel tank and the fuel supply of the combustion engine, block fluid communication between the first auxiliary fuel tank and both the main fuel tank and the filtration section, effect fluid communication between the second auxiliary fuel tank and both the main fuel tank and the filtration section, and block fluid communication between the second auxiliary fuel tank and the fuel supply of the combustion engine.

* * * * *